United States Patent [19]
Mizutani et al.

[11] 3,921,841
[45] Nov. 25, 1975

[54] TRANSFER DEVICE FOR HELICALLY WOUND TUBES

[75] Inventors: Tadashi Mizutani, Osaka; Hiromichi Tachibana, Ogaki, both of Japan

[73] Assignee: Kuraray Plastics Co., Ltd., Osaka, Japan

[22] Filed: Nov. 21, 1974

[21] Appl. No.: 525,815

[52] U.S. Cl. ................................................. 214/339
[51] Int. Cl.² .......................................... B65H 51/26
[58] Field of Search ..................................... 214/339

[56] References Cited
UNITED STATES PATENTS
2,048,948  7/1936  Postlewaite ......................... 214/339
2,940,322  6/1960  Uhing ............................ 214/339 X Primary Examiner—Robert G. Sheridan
Attorney, Agent, or Firm—Bacon & Thomas

[57] ABSTRACT

Support rollers for a helically wound and rotating tube are loosely mounted on a shaft. Stop means on the shaft engage one side of the rollers and hold the rollers against axial movement in one direction. Tilt control rollers engage the other side of the support rollers eccentrically of the shaft and are axially movable to tilt the support rollers on their shaft to a desired angle of tilt.

4 Claims, 12 Drawing Figures

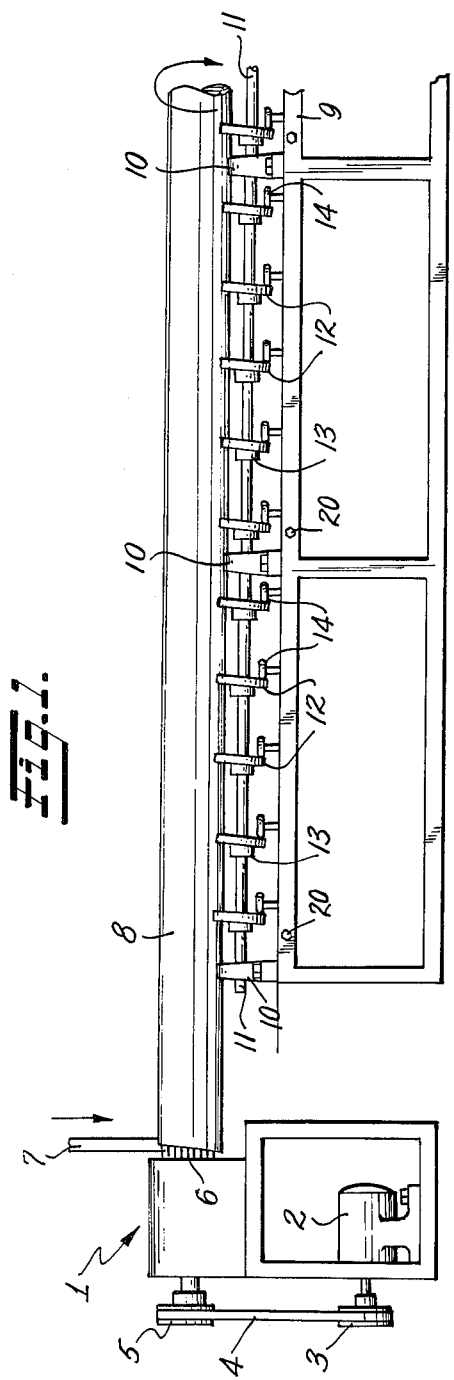
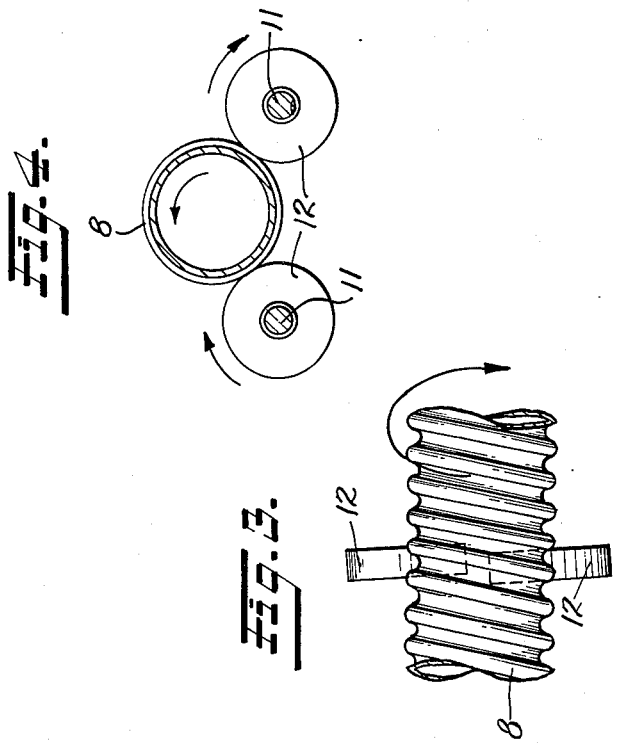
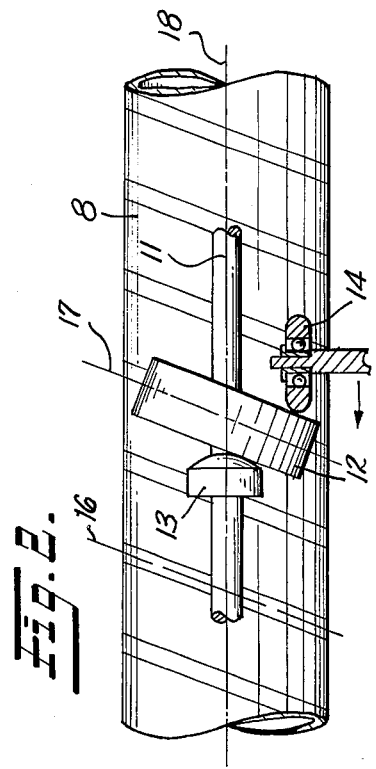

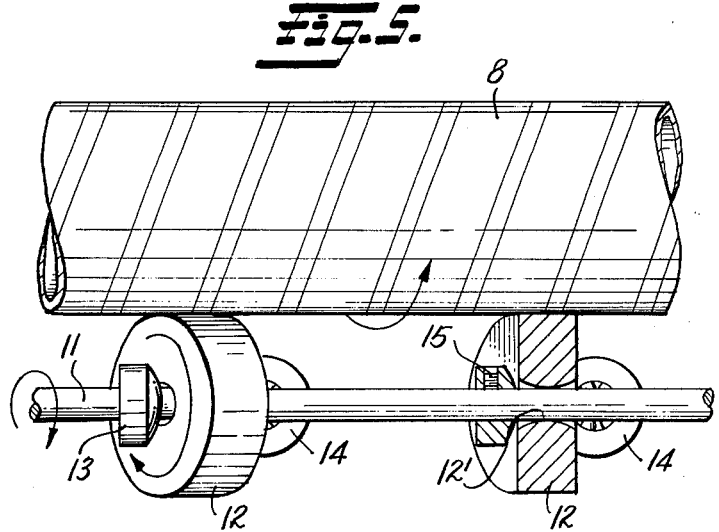
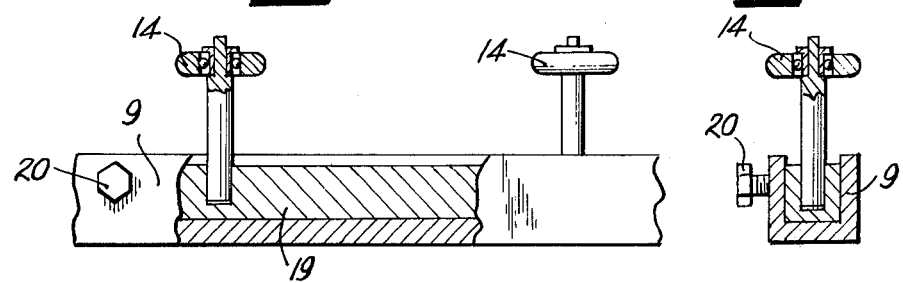
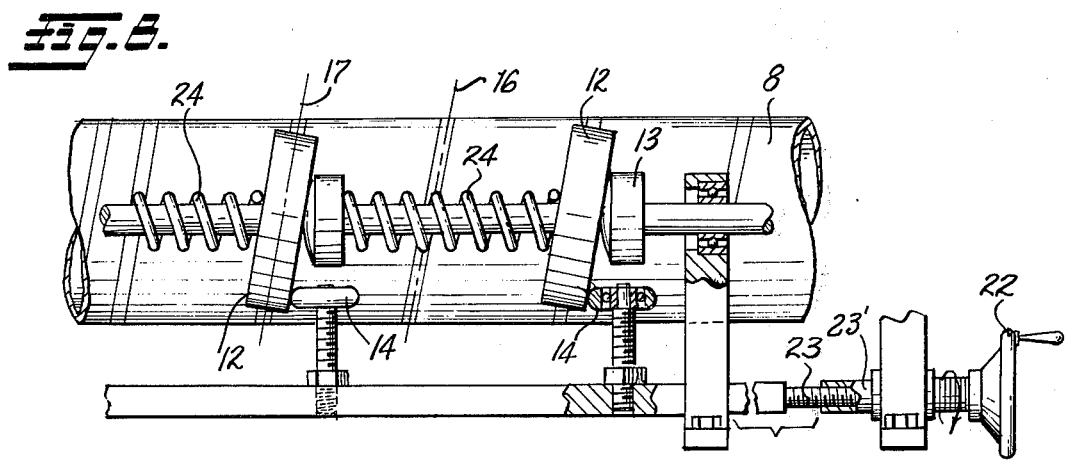

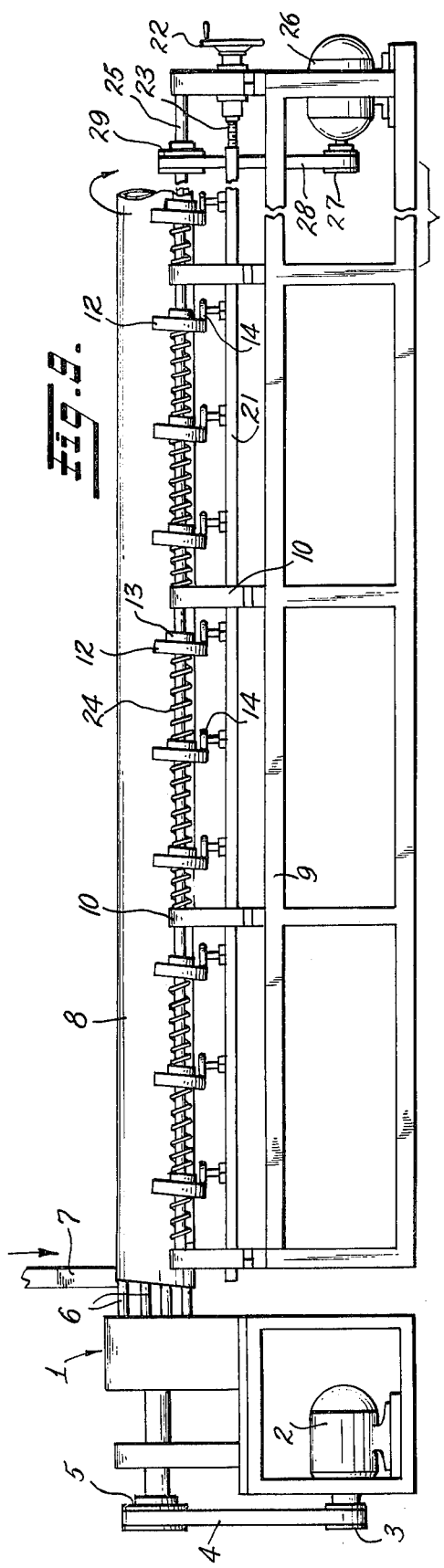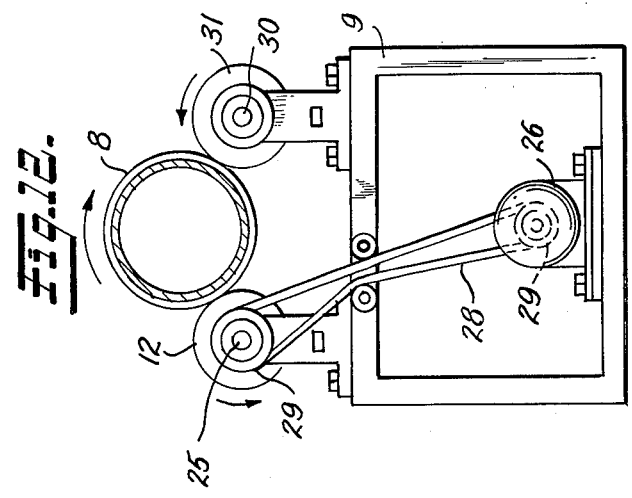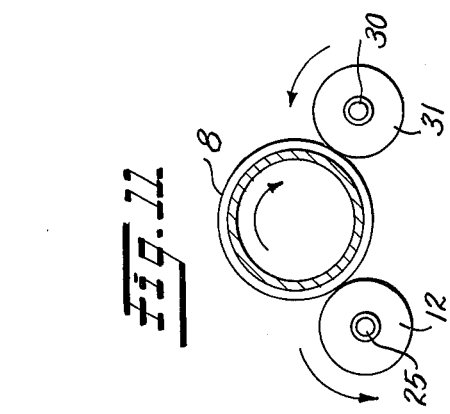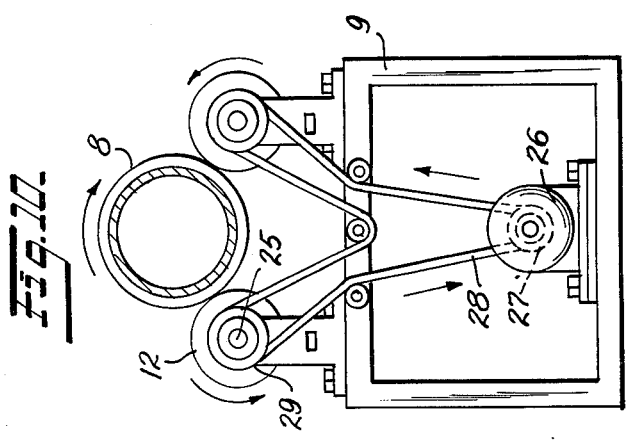

TRANSFER DEVICE FOR HELICALLY WOUND TUBES

BACKGROUND OF THE INVENTION

This invention relates to a transfer device for a spirally wound tube (hereinafter referred to from time to time as a tube) made of metal or synthetic material which is gradually and continuously fed from its fabricating device while being revolved helically. According to the invention, a rotating and translating force is applied to the tube by means of a highly simplified device, without regard to the tube diameter, the length, or the weight of the tube itself, so that the tube can be fabricated easily at a high speed and to a great length.

According to prior practice for translation of the spirally wound tube, the latter is supported by a number of support rollers while it is revolved helically and fed from the fabricating device. The mechanism and the control at the support rollers tend to become complicated because the tube is revolved at the same time that it is displaced in the axial direction. Thus, the shaft carrying the individual support rollers must be mounted relative to the tube that is revolved spirally and transferred axially in such a manner that the axis of the shaft is perpendicular to the direction of helix of the tube and each of said support rollers is tilted at an angle coincident with the direction of helix of the tube. The device comprising a number of such support rollers necessarily becomes complex. Moreover, an advanced control or management technique is required in oreder to impart the drive power to the individual support rollers in synchronism with the revolution and transfer of the tube, and provide that the tube movement is not resisted by the support rollers.

There has also been known a device adapted for advance of the spirally wound tube in which the tube being transferred is floated in a water tank. In this device, the revolution and transfer of the spiral tube are effected only by means of the tube fabricating device, and so the water contained in the water tank will prove to be a resistance and inhibit the high-speed fabrication and the fabrication of longer tubes, in which case some auxiliary means must be provided for transfer of the tube. Moreover, the tube cannot be taken out easily because of the deposition or entrance of the water on the surface or into the interior of the tube, or the tube cannot be packaged.

SUMMARY OF THE INVENTION

The present invention has for its object to provide a simplified apparatus free of the above-mentioned drawbacks and which enables high-speed fabrication of the tube and the fabrication of a tube of longer length.

According to this invention, a suitable number of support rollers are provided for supporting a tube that is fed gradually and continuously from a fabricating device as it is revolved in a helical direction. These support rollers are loosely mounted at suitable intervals on two or more shafts journalled horizontally and approximately parallel with each other in the axial direction of the tube. The tilt position of these support rollers can be adjusted easily into alignment with the direction of helix of the tube and, moreover, these support rollers are revolved freely by rotation and transfer of the tube.

A preferred embodiment of the present invention will be described hereinafter by referring to the accompanying drawings.

BRIEF DESCRIPTION OF THE DRAWINGS

FIG. 1 is a side view of a device embodying the present invention;

FIG. 2 is an enlarged detail of a portion of the device shown in FIG. 1;

FIG. 3 is a detail view showing a pair of support rollers;

FIG. 4 is an end view of FIG. 3;

FIG. 5 is an enlarged detail view of a transfer mechanism for the tube;

FIGS. 6 and 7 show details of the mounting for tilt control rollers 14;

FIG. 8 is an enlarged detail view of another embodiment of the invention;

FIG. 9 is a side view of a further embodiment of the invention;

FIG. 10 is an enlarged end view of the roller driving arrangement of FIG. 9 wherein both roller shafts are driven;

FIG. 11 is a schematic view showing one driven shaft and one nondriven shaft; and FIG. 12 shows driving means for the arrangement of FIG. 11.

DESCRIPTION OF THE PREFERRED EMBODIMENTS

In FIG. 1, a device 1, of known construction, for fabricating a helically wound tube is driven by a prime mover 2 by way of a pulley 3, belt 4 and a pulley 5. This device 1 is equipped with bearing means, a gear box and so forth, not shown, adapted to drive a plurality of rotary shafts 6 for producing the spirally wound tube. A band-like strip 7 made of synthetic resin or metal is supplied to the shafts 6 and fed out gradually in the form of a spirally wound tube as it is wound spirally by the rotary shafts 6 of the fabricating device 1.

Shafts 11 are journalled by bearing means 10 mounted on a frame 9. A suitable number of support rollers 12 are provided on each of the shafts 11 at suitable intervals therebetween for feeding onto the spirally wound tube 8. In FIG. 2, these support rollers 12 are positioned by stoppers 13 and tilted by tilt rollers 14 to an angle such that the axes of the support rollers will be perpendicular to the helical seam lines of the tube 8. The tilt rollers are shown only as a typical example of the tilt adjustment mechanism for the support rollers. The support rollers 12 are held rotatably at the adjusted tilt position by two or more shafts 11 which are provided to support the tube 8 and a suitable number of the support rollers 12 are provided at suitable intervals therebetween, although these components are shown only partially in FIG. 1 for the sake of clarity.

The details of structure of these components will be described below. FIG. 3 is a detail view showing the tube 8 supported by two support rollers 12, wherein the tube 8 is carried by the support rollers 12 which are inclined at an angle equal to that of the helical seamline of the tube. FIG. 4 is an end view of FIG. 3 showing the case in which two shafts 11 are provided. FIG. 5 is an enlarged partial detail view of the transfer mechanism for the spirally wound tube, wherein the support roller 12 is positioned relative to the shaft 11 by the stopper 13 secured to said shaft 11 by means of a screw 15. In the present embodiment, the support roller 12 has a central bore having a curved contact surface 12' and is loosely fitted by said surface on the shaft 11. As described above, the support roller is tilted by the tilt roller 14 in a direction coincident with that of helix of the tube and held in the thus tilted position.

The curved contact surfac 12' of the support roller 12 by which the latter is fitted loosely to the shaft 11 of the support roller 12 is designed for a support roller 12 of a considerable thickness (i.e. longer in axial length) but the curvature of the curved contact surface 12' may be altered as desired. When the support roller 12 is of a smaller thickness (i.e. shorter in axial length), it is not always necessary to provide a contact surface thereof with the shaft 11 curved. FIG. 2 shows in detail the method and the manner of tilting the support roller by the tilt roller 14 which is a typical tilt adjustment device for the support rollers 12. In FIG. 2, the tilt roller 14 is provided with bearings so as not to interfere with smooth rotation of the support roller 12. Said tilt rollers 14 are shifted in the direction of the arrow for adjusting the tilt of the support roller 12. The support roller 12 is tilted in such a way that the general peripheral line 17 of the support roller 12 is approximately aligned with the direction 22 of the helix of the spirally wound tube 8. FIGS. 6 and 7 show details of tilt roller 14 which is a typical tilt adjustment device. By shifting in the direction of the axis 18 the slide bar 19 mounted parallel to the axis 18 of tube 8, all of the tilt rollers 14 are moved the same amount and all the support rollers 12 are tilted to the same angle by tilt rollers 14. The position of support rollers 14 is fixed by bolt 20 and the tilt rollers 14 are mounted by bearings to thereby rotate smoothly with the support rollers 12. When shafts 11 are rotated, drive is imparted to rollers 12 by frictional engagement between rollers 12 and stop members 13, which are fixed to the shafts 11.

According to this invention, the rotational support roller is mounted in a loose state on the shafts mounted parallel to the axis of the tube, and the tilt control rollers 14 are mounted so as to abut on a side of the support roller offset from the axis of the support roller, which can then be shifted in one direction until the general peripheral line of the support roller is aligned with the direction of the helix of the tube. The tilt of the support roller is maintained to a constant value by the medium of the stopper 13. The tilt of the support roller adapted for imparting the rotational and transfer power to the tube can thus be set easily and in a simple manner and the support roller, once tilted, can be revolved in a constant helical direction without disturbance. The support rollers loosely fitted to each of the two or more shafts mounted parallel to the axis of the tube act without difficulty to effect rotation and translation of the tube. The tube may thus be translated axially as it is fabricated and without regard to the tube diameter, fabrication length or the tube shape, and the tube can be fabricated more speedily and to a greater length than attainable heretofore in the conventional practice.

In addition, in the conventional transfer device such as a water tank, it takes much labor to remove the tube from the water tank, whereas the tube merely resets on the support rollers in the present device so the tube can be removed towards the operators' side easily and in a simple manner by deflecting a part of the tube out of the transfer device at one desired location of the transfer device by applying a slight force while utilizing the drive power of the driving rotary shaft. At this time, the tube can be taken out as a whole from the transfer device.

As described above, the present invention provides a simplified transfer device for the spirally wound tube which is gradually and continuously fed from the fabricating device as the peripheries of the support rollers run parallel to the helical seam lines of the tube. The device is suitable especially for the transfer of spiral tubes made of synthetic resin and enables a long tube to be fabricated speedily and smoothly without distorting the shape of the spiral tube emerging from the fabricating device.

The present invention may be applied effectively to tubes provided with corrugated or smooth surfaces.

FIG. 8 is a greatly enlarged detailed elevational view of another preferred embodiment of the present invention. This transfer device comprises elastic members each being located at the sides of the support rollers opposite to the stoppers, for maintaining the tilt of said support rollers, said elastic members being fitted on each of said driving rotary shafts. These support rollers loosely fitted to each of the two or more shafts 11 are positioned by stoppers 13 and tilt rollers 14 are fitted to a shaft or rod 21, and a screw 23 connects the rod 21 and the threaded member 23' and handle 22. When the handle 22 is revolved, the rod 21 and the tilt rollers 14 are shifted in the direction of the arrow for adjusting the tilt of the support rollers 12 which may then be maintained at a constant angle by the springs 24. Said support rollers are rotatably driven by stoppers 13 on shaft 11.

In contrast to the case wherein the spring 24 or the resilient member for maintaining the tilt of the support roller 12 is not provided, the resilient member acts to hold the support roller 12 between it and the stopper 13 and the tilt of the support roller is maintained at a constant angle and correctness by the medium of the stopper and the resilient member, and the support roller can be revolved in a constant helical direction without disturbance. Elastic members may be steel springs, elastic rubber, synthetic rubber, etc.

FIG. 9 is an overall view of another embodiment of the present invention, the translating device comprising two driving rotary shafts on which fit loosely the support rollers 12. Driving rotary shafts 25 are journalled by bearing means 10 mounted on a frame 9 and are driven by another prime motor 26 by way of a pulley 27, belt 28 and pulley 29. A suitable number of support rollers 12 are provided on each of the driving rotary shaft 25 at suitable intervals therebetween for feeding the helically wound tube 8. These support rollers 12 are positioned by stoppers 13 and tilted by tilt rollers 14 which are axially shifted by turning handle 19 to an angle such that the peripheries of the support rollers will run parallel to the helical seam line of the tube 8. The tilt rollers are shown only as a typical example of the tilt adjustment mechanism for the support rollers. The support rollers 12 are held at the adjusted tilt position by springs 24 which are shown only as an example of the resilient holding device. FIG. 10 shows the driving system for the transfer mechanism for the spirally wound tube in which the drive power from the motor 26 is transmitted to the support rollers 12 through the pulley 27, belt 28 and pulley 29. As the resilient members act to hold the support rollers between them and the stoppers, sufficient drive power of two or more driving rotary shafts mounted parallel to the axis of the tube may be transmitted at all times to the support rollers. And the rotational force and translation force of the driving rotary shafts are transmitted to the support rollers and thence to the tube, the support rollers do not prove to be a resistance to the rotation and axial movement of the tube, which may be prevented from becoming distorted or otherwise affected in its configuration. Thus, the tube can be fabricated more speedily and to a greater length. FIG. 11 shows in side elevation the main parts of an embodiment provided with one driving rotary shaft 25 and one fixed shaft 30. FIG. 12 shows the drive system in which the drive power is transmitted from a prime mover 26 to a driven rotary shaft 25 by way of a pulley 27, belt 28 and a pulley 29 for driving said shaft 25, and a fixed shaft 30 to which a support roller 31 is mounted loosely.

The said transfer device provides a series of driving support rollers inclined in the same direction as the direction of helix of the tube, and a series of idle support rollers, for conjointly supporting the tube as the latter is fed out gradually and continuously from the fabricating device with a helical winding movement.

These series of the driving and idle support rollers are loosely mounted at suitable intervals on the respective shafts which are journalled horizontally and approximately parallel to the axis of the tube. The driving support rollers can be adjusted easily in their tilt position so as to conform with the direction of helix of the tube, and are operative to transmit the drive power to the tube so as to transfer the latter with the helical winding movement. The idle support rollers are fitted to the fixed shaft and are operative to evenly and stably support the tube so as to hold the latter to a constant shape and size. When the driving rotary shaft and the fixed shaft are provided, the drive is transmitted from only one shaft to the tube and so the drive power transmitted to the tube is necessarily lower than that needed by using two or more driven shafts. However, in this case, a nonuniform rotation or a resonance oscillation may be avoided and the tube may be transferred smoothly with a uniform helical winding movement. In addition, since the small mechanical vibration that may be transmitted to the tube from the driving rotary shaft and fluctuations in the load of the power source may be absorbed by the idle support rollers fitted to the fixed shaft, so that the tube may always be produced with a constant shape. And the overall device may be simple because no prime mover need be installed for the fixed shaft. Moreover, the design and mounting of the device and the centering of the driving shaft are also facilitated.

We claim:

1. A transfer device for a spirally wound tube being fed gradually and continuously from a fabricating device with a helical rotating movement, said transfer device comprising: at least two shafts journalled horizontally and substantially in parallel with each other, support rollers arranged to support the spirally wound tube and loosely fitted to each of said shafts in spaced relation, stoppers on said shafts for positioning said support rollers thereon by engaging one side thereof, tilt adjustment means for said support rollers offset from the axes of said support rollers operative to press the other sides of said support rollers so that the axis of each of said support rollers is inclined relative to the axis of its shaft, wherein said support rollers are loosely fitted to the shafts and serve to support and transfer the spirally wound tube while said support rollers are rotated with a tilt approximately equal to the direction of the helix of the tube which moves axially while it is revolved.

2. A transfer device as defined in claim 1 wherein elastic members on said shafts are located at said other sides of said support rollers for maintaining the tilt of said support rollers and pressing them against said stoppers.

3. A transfer device as defined in claim 2 wherein said means are provided for rotating said shafts and thereby said support rollers.

4. A transfer device for a spirally wound tube being fed gradually and continuously from a fabricating device with a helical winding movement, said transfer device comprising: a driving rotary shaft and at least one fixed shaft mounted in parallel with said driving rotary shaft, said driving rotary shaft including a series of driving support rollers for the tube mounted loosely on the driving rotary shaft in spaced relation thereon, stopper means for axially positioning said driving support rollers on said driving rotary shaft, tilt adjustment means for said driving support rollers adapted to press against the side of said driving support rollers at a position offset from the axis of the driving support roller, and resilient means on the driving rotary shaft at the opposite side of said rollers from said stopper means for maintaining said driving support rollers in tilted positions relative to their shaft, said fixed shaft including a series of idle support rollers for the tube which rollers are loosely fitted on the fixed shaft at suitable intervals therebetween, and stopper means for positioning said support rollers on said fixed shaft.

* * * * *